United States Patent [19]

Daulasim

[11] Patent Number: 5,058,135
[45] Date of Patent: Oct. 15, 1991

[54] MODULATING ARRANGEMENT FOR PHASE AND AMPLITUDE MODULATION OF A WAVE

[75] Inventor: Khamphuc Daulasim, Longjumeau, France

[73] Assignee: Telecommunications Radioelectriques et Telephoniques T.R.T., Paris, France

[21] Appl. No.: 382,608

[22] Filed: Jul. 19, 1989

[30] Foreign Application Priority Data

Jul. 22, 1988 [FR] France .................. 88 09952

[51] Int. Cl.[5] .................. H03D 5/00; H03K 7/10
[52] U.S. Cl. .................. 375/42; 375/39; 371/43
[58] Field of Search .................. 332/103; 375/39, 42, 375/17, 27, 25, 67; 455/60; 370/20; 371/43

[56] References Cited

U.S. PATENT DOCUMENTS

| | | | |
|---|---|---|---|
| Re. 33,041 | 8/1989 | Calderbank et al. | 375/39 |
| 4,327,439 | 4/1982 | Glockler et al. | 375/67 |
| 4,404,532 | 9/1983 | Welti | 332/103 |
| 4,442,530 | 4/1984 | Parrish, Jr. et al. | 375/67 |
| 4,745,628 | 5/1989 | McDavid et al. | 375/39 |
| 4,894,844 | 1/1990 | Forney, Jr. | 375/42 |
| 4,901,331 | 2/1990 | Calderbank et al. | 375/39 |

OTHER PUBLICATIONS

L. Mary, "Processeurs de Signaux: Capacite et Performances", Toute L'Electroniques, No. 7, Oct. 1987, pp. 52-60.

Primary Examiner—Stephen Chin
Attorney, Agent, or Firm—Jack D. Slobod

[57] ABSTRACT

An arrangement by which a sinusoidal wave is modulated in phase and amplitude in response to groups of bits includes an input (1) for receiving the groups of bits, a phase shifting circuit (5, 7) for producing two phase-shifted components of the wave and a modulating circuit for modulating the amplitude of the two components as a function of the groups. The modulating circuit includes a ROM (25), addressed by part of the n bits of the bit groups for producing an initial amplitude value, and a calculating unit (30) for obtaining final amplitude values by changing original values according to the remaining part of the bits of the bit groups.

9 Claims, 5 Drawing Sheets

MODULATING ARRANGEMENT FOR PHASE AND AMPLITUDE MODULATION OF A WAVE

BACKGROUND OF THE INVENTION

The present invention relates to a modulating arrangement for phase and amplitude modulation of a wave, the arrangement comprising an input for receiving groups of bits, a phase shifting circuit for producing two phase-shifted components of the said wave and a modulating circuit for modulating the amplitude of the two components as a function of the said groups.

Such arrangements find important applications, specifically in modems, and similar equipment used for data transmission.

Currently, ever higher transmission rates are required whereas the pass-bands of the transmission channels remain limited. A means for harmonising these contradictory requirements consists of using a combined amplitude and phase modulation of a carrier wave. To each amplitude-phase combination there corresponds a group of bits so that for obtaining high rates a large number of combinations has to be used. For example, Recommendation V.33 of the CCITT indicates, for a rate of 14,400 bits per second, the use of 128 combinations, each of which representing a group of 7 bits.

It will be evident that that for making these combinations, memories which are addressed by the said groups and produce the phase and amplitude information signals of the carrier in response thereto, are preprogrammed. However, it is estimated that the size of such a memory, especially for fulfilling the above Recommendation, is too large because this arrangement is a component of an integrated modem. This type of modem uses a signal processor as described in the article by L. MARY "Processeur de signaux: capacité et performances" published in the journal TOUTE L'ELECTRONIQUES No. 527, October 1987, pages 52–60. The processors are often associated with rather small-sized memories on the same chip, so that it is impossible to store many combinations.

SUMMARY OF THE INVENTION

It is an object of the present invention to provide a modulating arrangement of the type mentioned in the preamble, which is particularly intended for being inserted in a modem of the integrated type and which thus does not require a large memory for storing many combinations.

Therefore, such a modulating arrangement is characterized in that the modulating circuit comprises storage means addressed by part of the bits of the bit groups for producing an original (or initial) amplitude value, and calculating means for obtaining the final amplitude values by changing the original values according to the remaining part of the bits of the bit groups.

BRIEF DESCRIPTION OF THE DRAWING

With the following description accompanied by the annexed drawings, all this given by way of a non-limiting example, it will be better understood how the invention can be realised, in which.

DETAILED DESCRIPTION OF THE PREFERRED EMBODIMENTS

Figure 1:
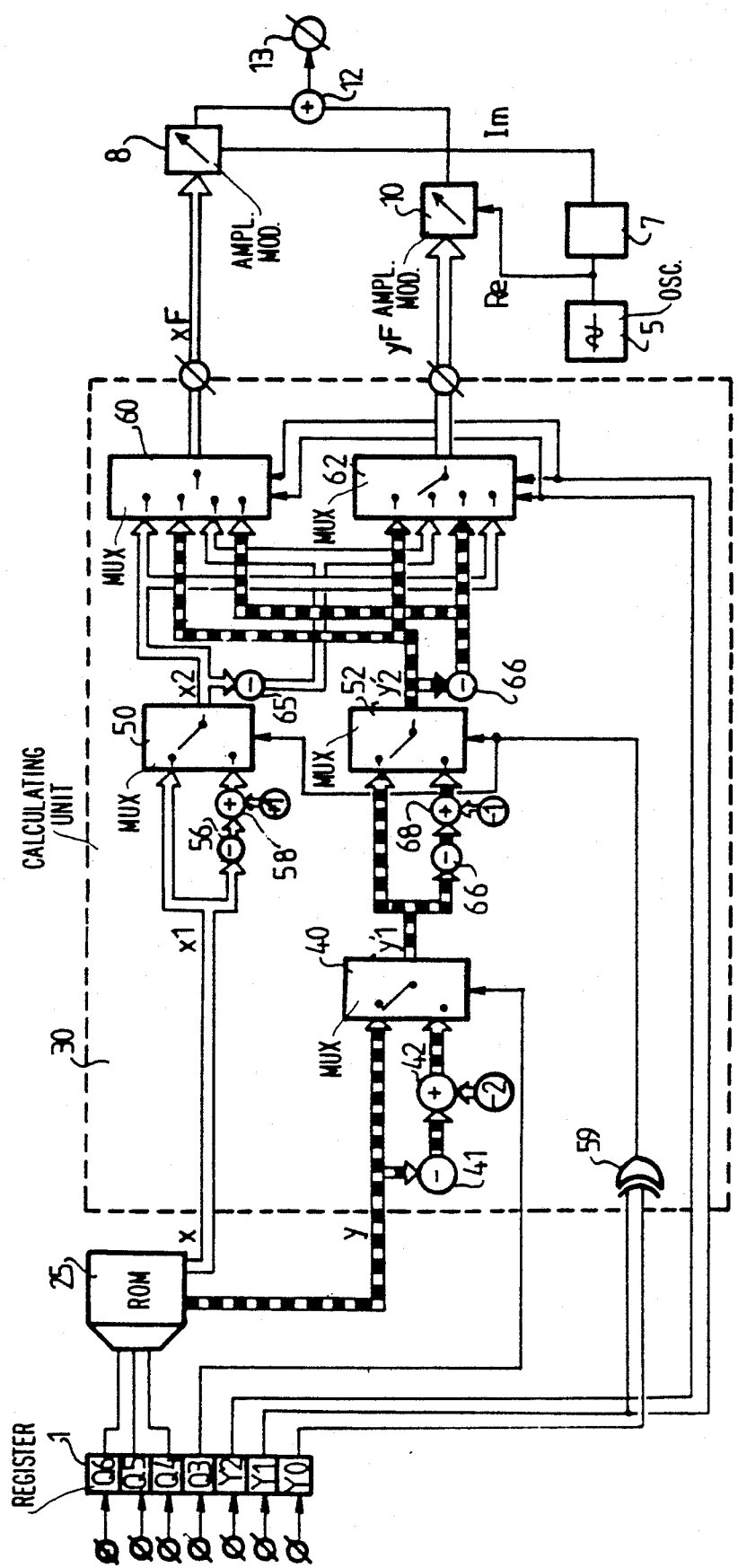
FIG. 1 shows an embodiment of a modulating arrangement according to the invention.

In FIG. 1 the reference 1 shows a register intended for containing a group of 7 bits Y0, Y1, Y2, Q3, Q4, Q5 and Q6; 128 amplitude-phase combinations of one carrier wave will correspond with these 7 bits. These 128 combinations are shown in the form of the transmission constellation of FIG. 2. All this is in accordance with Recommendation V.33 mentioned hereinbefore. In order to obtain these combinations, it is possible to modulate the amplitude of two quadrature components of the carrier. In FIG. 1, the oscillator 5 produces a component Re and a phase shifter 7 shifting this component by $\pi/2$ for producing a second component Im. Two amplitude modulators 8 and 10 modulate these two respective components. By discretely acting on these different amplitudes the 128 points of the FIG. 2 will be obtained of which each point represents a combination of amplitude and phase. The Table I shown hereinafter provides the value of the groups GR: Q6, Q5, Q4, Q3, Y2, Y1 and Y0 with respect to each of these points and the amplitudes of the components Im and Re. An adder 12 adds up these values in order to provide them at output 13.

TABLE I

|     | GR      | Re  | Im  |
| --- | ------- | --- | --- |
| P1  | 0000110 | −2  | +9  |
| P2  | 0001110 | +2  | +9  |
| P3  | 0000011 | −3  | +8  |
| P4  | 1001111 | −1  | +8  |
| P5  | 0001011 | +1  | +8  |
| P6  | 1000111 | +3  | +8  |
| P7  | 1100100 | −4  | +7  |
| P8  | 1001010 | −2  | +7  |
| P9  | 1110100 | 0   | +7  |
| P10 | 1000010 | +2  | +7  |
| P11 | 1010100 | +4  | +7  |
| P12 | 1011101 | −5  | +6  |
| P13 | 1100001 | −3  | +6  |
| P14 | 1111101 | −1  | +6  |
| P15 | 1110001 | +1  | +6  |
| P16 | 1101101 | +3  | +6  |
| P17 | 1010001 | +5  | +6  |
| P18 | 1010110 | −6  | +5  |
| P19 | 1011000 | −4  | +5  |
| P20 | 0010110 | −2  | +5  |
| P21 | 1111000 | 0   | +5  |
| P22 | 0011110 | +2  | +5  |
| P23 | 1101000 | +4  | +5  |
| P24 | 1011110 | +6  | +5  |
| P25 | 1010011 | −7  | +4  |
| P26 | 1101111 | −5  | +4  |
| P27 | 0010011 | −3  | +4  |
| P28 | 0101111 | −1  | +4  |
| P29 | 0011011 | +1  | +4  |
| P30 | 0100111 | +3  | +4  |
| P31 | 1011011 | +5  | +4  |
| P32 | 1100111 | +7  | +4  |
| P33 | 1000100 | −8  | +3  |
| P34 | 1101010 | −6  | +3  |
| P35 | 0100100 | −4  | +3  |
| P36 | 0101010 | −2  | +3  |
| P37 | 0110100 | 0   | +3  |
| P38 | 0100010 | +2  | +3  |
| P39 | 0010100 | +4  | +3  |
| P40 | 1100010 | +6  | +3  |
| P41 | 0000100 | +8  | +3  |

TABLE I-continued

| | GR | Re | Im |
|---|---|---|---|
| P42 | 0001101 | −9 | +2 |
| P43 | 1000001 | −7 | +2 |
| P44 | 0011101 | −5 | +2 |
| P45 | 0100001 | −3 | +2 |
| P46 | 0111101 | −1 | +2 |
| P47 | 0110001 | +1 | +2 |
| P48 | 0101101 | +3 | +2 |
| P49 | 0010001 | +5 | +2 |
| P50 | 1001101 | +7 | +2 |
| P51 | 0000001 | +9 | +2 |
| P52 | 0001000 | −8 | +1 |
| P53 | 1101110 | −6 | +1 |
| P54 | 0011000 | −4 | +1 |
| P55 | 0110110 | −2 | +1 |
| P56 | 0111000 | 0 | −1 |
| P57 | 0111110 | +2 | +1 |
| P58 | 0101000 | +4 | +1 |
| P59 | 1111110 | +6 | +1 |
| P60 | 1001000 | +8 | +1 |
| P61 | 1110011 | −7 | 0 |
| P62 | 1111111 | −5 | 0 |
| P63 | 0110011 | −3 | 0 |
| P64 | 0111111 | −1 | 0 |
| P65 | 111011 | +1 | 0 |
| P66 | 110111 | +3 | 0 |
| P67 | 111011 | +5 | 0 |
| P68 | 110111 | +7 | 0 |
| P69 | 00100 | −8 | −1 |
| P70 | 111010 | −6 | −1 |
| P71 | 101100 | −4 | −1 |
| P72 | 111010 | −2 | −1 |
| P73 | 111100 | 0 | −1 |
| P74 | 110010 | +2 | −1 |
| P75 | 011100 | +4 | −1 |
| P76 | 110010 | +6 | −1 |
| P77 | 001100 | +8 | −1 |
| P78 | 000101 | −9 | −2 |
| P79 | 001001 | −7 | −2 |
| P80 | 010101 | −5 | −2 |
| P81 | 0101001 | −3 | −2 |
| P82 | 0110101 | −1 | −2 |
| P83 | 0111001 | +1 | −2 |
| P84 | 0100101 | +3 | −2 |
| P85 | 0011001 | +5 | −2 |
| P86 | 1000101 | +1 | −2 |
| P87 | 0001001 | +9 | −2 |
| P88 | 0000000 | −8 | −3 |
| P89 | 1100110 | −6 | −3 |
| P90 | 0010000 | −4 | −3 |
| P91 | 0100110 | −2 | −3 |
| P92 | 0110000 | 0 | −3 |
| P93 | 0101110 | +2 | −3 |
| P94 | 0100000 | +4 | −3 |
| P95 | 1101110 | +6 | −3 |
| P96 | 1000000 | +8 | −3 |
| P97 | 1100011 | −7 | −4 |
| P98 | 1011111 | −5 | −4 |
| P99 | 0100011 | −3 | −4 |
| P100 | 0011111 | −1 | −4 |
| P101 | 0101011 | +1 | −4 |
| P102 | 0010111 | +3 | −4 |
| P103 | 1101011 | +5 | −4 |
| P104 | 1010111 | +7 | −4 |
| P105 | 1011010 | −6 | −5 |
| P106 | 1101100 | −4 | −5 |
| P107 | 0011010 | −2 | −5 |
| P108 | 1111100 | 0 | −5 |
| P109 | 0010010 | +2 | −5 |
| P110 | 1011100 | +4 | −5 |
| P111 | 1010010 | +6 | −5 |
| P112 | 1010101 | −5 | −6 |
| P113 | 1101001 | −3 | −6 |
| P114 | 1110101 | −1 | −6 |
| P115 | 1111001 | +1 | −6 |
| P116 | 1100101 | +3 | −6 |
| P117 | 1011001 | +5 | −6 |
| P118 | 1010000 | −4 | −7 |
| P119 | 1000110 | −2 | −7 |
| P120 | 1110000 | 0 | −7 |
| P121 | 1001110 | +2 | −7 |
| P122 | 1100000 | +4 | −7 |

TABLE I-continued

| | GR | Re | Im |
|---|---|---|---|
| P123 | 1000011 | −3 | −8 |
| P124 | 0001111 | −1 | −8 |
| P125 | 1001011 | +1 | −8 |
| P126 | 0000111 | +3 | −8 |
| P127 | 0001010 | −2 | −9 |
| P128 | 0000010 | +2 | −9 |

Figure 2:
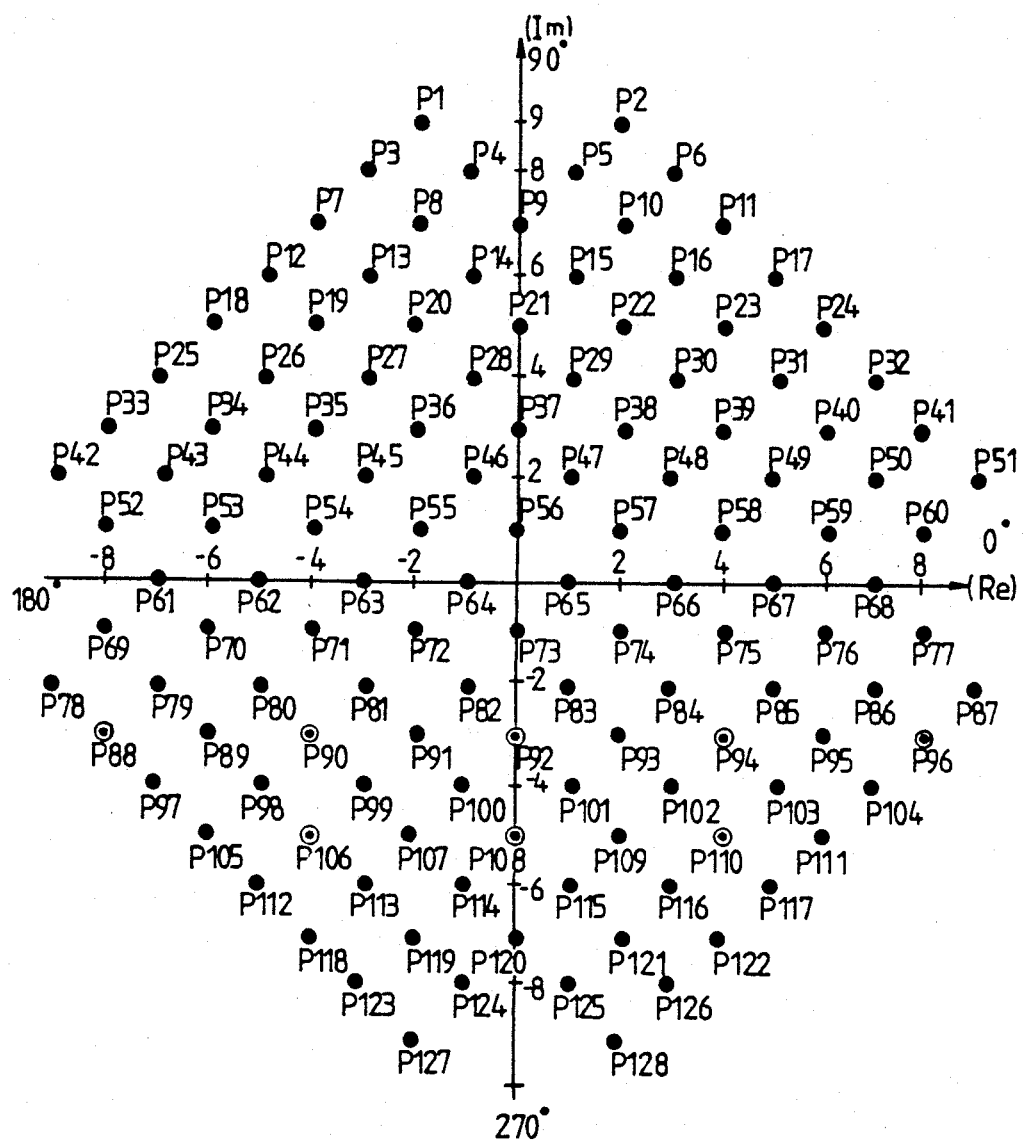
FIG. 2 shows a constellation of amplitude-phase combinations relating to the normal transmission rate according to Recommendation V.33.

In accordance with the invention the modulating arrangement comprises a memory 25 addressed by the bits Q6, Q5 and Q4 and produces in a binary form original (or initial) amplitude values with respect to the components Re, Im; these amplitude values "x" and "y" are shown for simplicity in the decimal system used in the Table II below and may be viewed as a stored constellation of eight points which are indicated as circles in FIG. 2 centered about eight points in the normal transmission constellation with which they coincide.

TABLE II

| Q6 | Q5 | Q4 | x | y |
|---|---|---|---|---|
| 0 | 0 | 0 | −8 | −3 |
| 0 | 0 | 1 | −4 | −3 |
| 0 | 1 | 0 | +4 | −3 |
| 0 | 1 | 1 | 0 | −3 |
| 1 | 0 | 0 | +8 | −3 |
| 1 | 0 | 1 | −4 | −7 |
| 1 | 1 | 0 | +4 | −7 |
| 1 | 1 | 1 | 0 | −7 |

The arrangement according to the invention expands the stored constellation into the transmission constellation utilizing a calculating unit 30 for obtaining the final amplitude values Re and Im by modifying the values "x" and "y" as a function of the bits Q3, Y2, Y1 and Y0. This unit 30 first comprises a multiplexer 40 which provides at its output the value Y1 which either has the initial value "y" or the value −y−2; the latter value is obtained by means of an inverter 41 and an adder 42 which adds "−2" to the value produced by the inverter 41. It should be recognized by examining FIG. 2 that a shifting of points in the stored constellation by 2 units along a coordinate will cause them to coincide with various other points in the transmission constellation. The position of the multiplexer 40 is determined by the bit Q3 in a manner such that the values x1 and y1 established on the basis of x and y can be written as:

If Q3=0 then x1=x and y1=y
If Q3=1 then x1=x and y1=−y−2.

Two further multiplexers 50 and 52 are provided for supplying at their respective outputs the values x2 and y2. The value x2 can be either the value x1 (or x) or the value −x1+1 which is obtained by means of an inverter 56 and an adder 58 adding "+1" to the value produced by the inverter 56. The value y2 may be either the value y1 or the value −y1−1 which is obtained by means of an inverter 66 and an adder 68; this adder 68 adds the value "−1" to the value produced by the inverter 66. It should be recognized by again examining FIG. 2 that a shifting of points in the stored constellation along both coordinates simultaneously by one unit will cause them to coincide with still further points in the transmission constellation. The position of the multiplexers 50 and 52 is determined by the logic value of a signal appearing at the output of an "EXCLUSIVE-OR" gate 59 so that the following may be written:

If Y1⊕Y0=0 then x2=x1  y2=y1
If Y1⊕Y0=1 then x2=−x1+1  y2=−y1−1

In order to produce the final values xF and yF which determine the amplitude of the components Re and Im, two multiplexers 60 and 62 having four positions are provided which receive at their inputs the values x2, y2, −x2 and −y2 whereas the negative values are obtained via the inverters 65 and 66 respectively. The positions of these multiplexers are determined by the bits Y2 and Y1. The Table III shown hereinbelow provides the values xF and yF as a function of Y2 and Y1 which corresponds to selectively rotating a vector having the components X2, Y2, clockwise about the origin of an X, Y plane by 0°, 90°, 180° or 270°.

TABLE III

| Y2 | Y1 | xF | yF |
|----|----|----|----|
| 0  | 0  | x2 | y2 |
| 0  | 1  | y2 | −x2 |
| 1  | 0  | −x2 | −y2 |
| 1  | 1  | −y2 | x2 |

Figure 3:
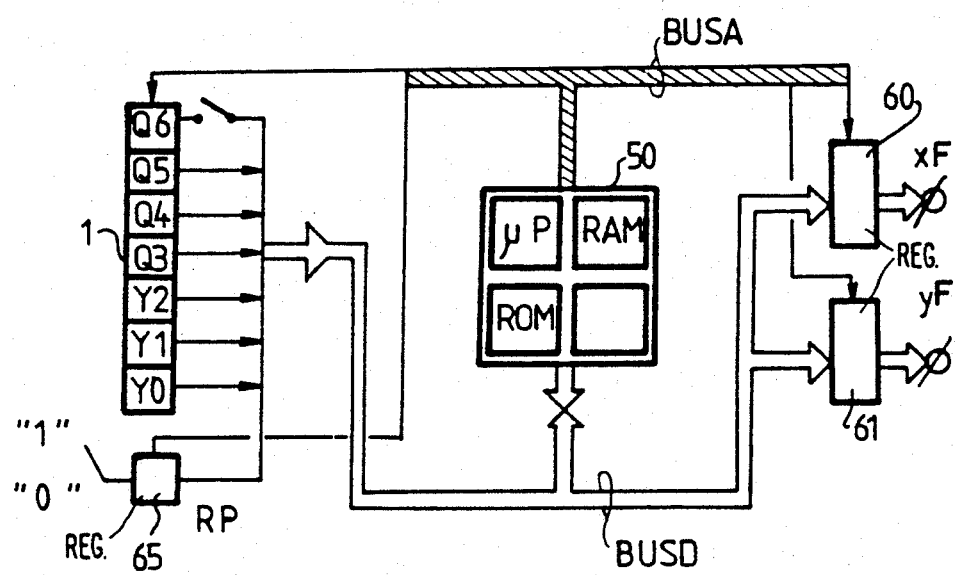
FIG. 3 shows the preferred embodiment of a modulating arrangement in accordance with the invention.
Figure 4:
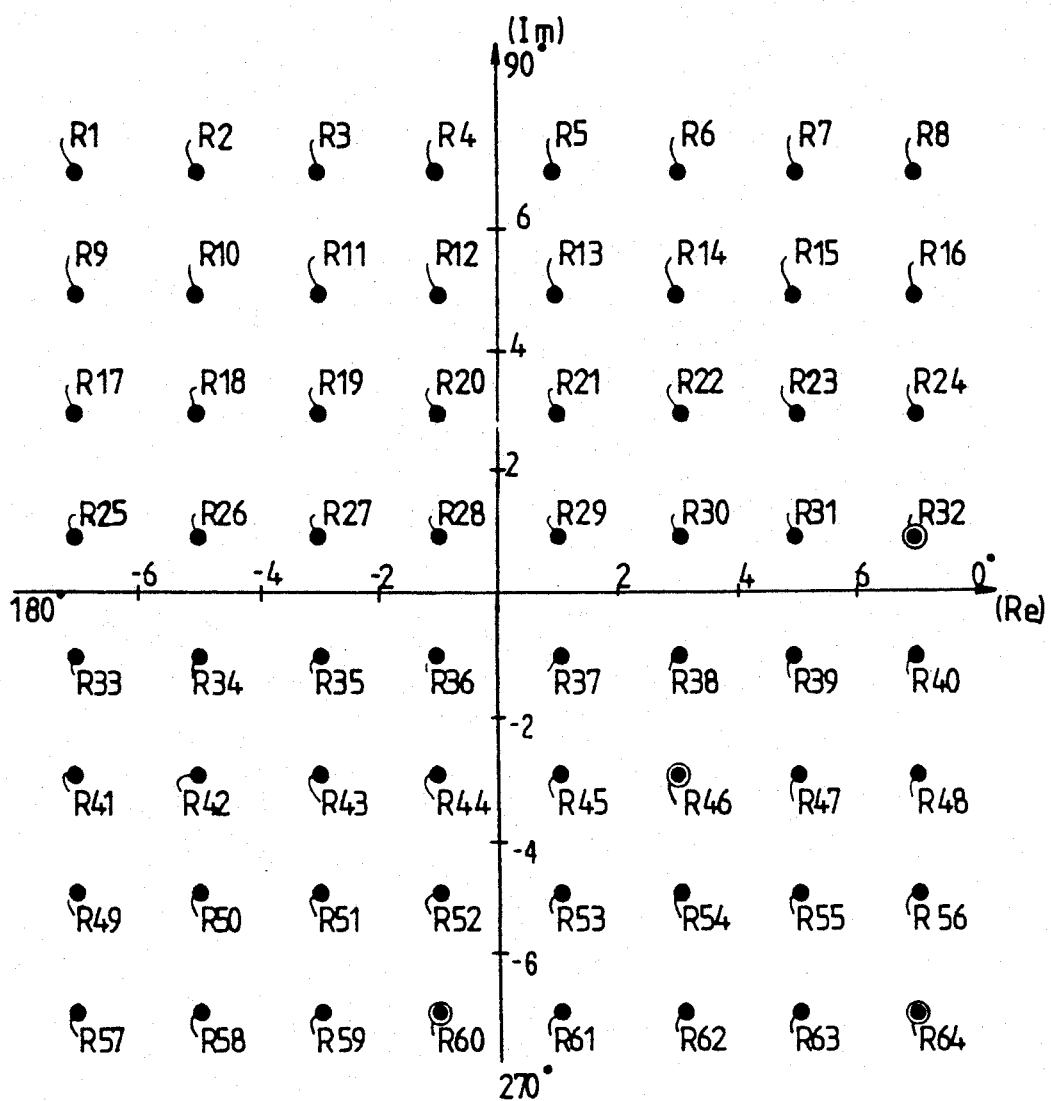
FIG. 4 shows a constellation relating to the speed of the transmission foldback still according to Recommendation V.33.

FIG. 3 shows the preferred embodiment of an arrangement according to the invention. It is built around a microprocessor set 50 comprising a random access memory (RAM) and a memory containing the operation program as well as data specifically those indicated in Table III (ROM), as well as the actual microprocessor (μP). This set communicates with external lines via a data line BUSD for receiving the data specifically from the register 1 and supplying them to final registers 60 and 61 which contain the final values xF and yF respectively. A line BUSA enables to select these different registers 1, 60 and 61 as well as a register 65. This register comprises a foldback indication. In fact, when referring to Recommendation V.33, it is provided to transmit data at a foldback rate which is 12,000 bits/s instead of the rate of 14,400 bits/s as implied by the constellation represented in FIG. 2. The foldback rate thus implies a different constellation represented in FIG. 4. The Table IV shows groups of foldback bits Q5, Q4, Q3, Y2, Y1 and Y0 as a function of final values xF and yF.

TABLE IV

|     |        | xF | yF |
|-----|--------|----|----|
| R1  | 010100 | −7 | +7 |
| R2  | 010001 | −5 | +7 |
| R3  | 111110 | −3 | +7 |
| R4  | 000111 | −1 | +7 |
| R5  | 011100 | +1 | +7 |
| R6  | 011001 | +3 | +7 |
| R7  | 110110 | +5 | +7 |
| R8  | 010111 | +7 | +7 |
| R9  | 110101 | −7 | +5 |
| R10 | 110000 | −5 | +5 |
| R11 | 111011 | −3 | +5 |
| R12 | 000010 | −1 | +5 |
| R13 | 100101 | +1 | +5 |
| R14 | 100000 | +3 | +5 |
| R15 | 110011 | +5 | +5 |
| R16 | 010010 | +7 | +5 |
| R17 | 011110 | −7 | +3 |
| R18 | 100111 | −5 | +3 |
| R19 | 001100 | −3 | +3 |
| R20 | 001001 | −1 | +3 |
| R21 | 101110 | +1 | +3 |
| R22 | 001111 | +3 | +3 |
| R23 | 111100 | +5 | +3 |
| R24 | 111001 | +7 | +3 |
| R25 | 011011 | −7 | +1 |
| R26 | 100010 | −5 | +1 |
| R27 | 101101 | −3 | +1 |
| R28 | 101000 | −1 | +1 |
| R29 | 101011 | +1 | +1 |
| R30 | 001010 | +3 | +1 |
| R31 | 000101 | +5 | +1 |
| R32 | 000000 | +7 | +1 |
| R33 | 000100 | −7 | −1 |
| R34 | 000001 | −5 | −1 |
| R35 | 001110 | −3 | −1 |
| R36 | 101111 | −1 | −1 |
| R37 | 101100 | +1 | −1 |
| R38 | 101001 | +3 | −1 |
| R39 | 100110 | +5 | −1 |
| R40 | 011111 | +7 | −1 |
| R41 | 111101 | −7 | −3 |
| R42 | 111000 | −5 | −3 |
| R43 | 001011 | −3 | −3 |
| R44 | 101010 | −1 | −3 |
| R45 | 001101 | +1 | −3 |
| R46 | 001000 | +3 | −3 |
| R47 | 100011 | +5 | −3 |
| R48 | 011010 | +7 | −3 |
| R49 | 010110 | −7 | −5 |
| R50 | 110111 | −5 | −5 |
| R51 | 100100 | −3 | −5 |
| R52 | 100001 | −1 | −5 |
| R53 | 000110 | +1 | −5 |
| R54 | 111111 | +3 | −5 |
| R55 | 110100 | +5 | −5 |
| R56 | 110001 | +7 | −5 |
| R57 | 010011 | −7 | −7 |
| R58 | 110010 | −5 | −7 |
| R59 | 011101 | −3 | −7 |
| R60 | 011000 | −1 | −7 |
| R61 | 000011 | +1 | −7 |
| R62 | 111010 | +3 | −7 |
| R63 | 010101 | +5 | −7 |
| R64 | 010000 | +7 | −7 |

Figure 5:
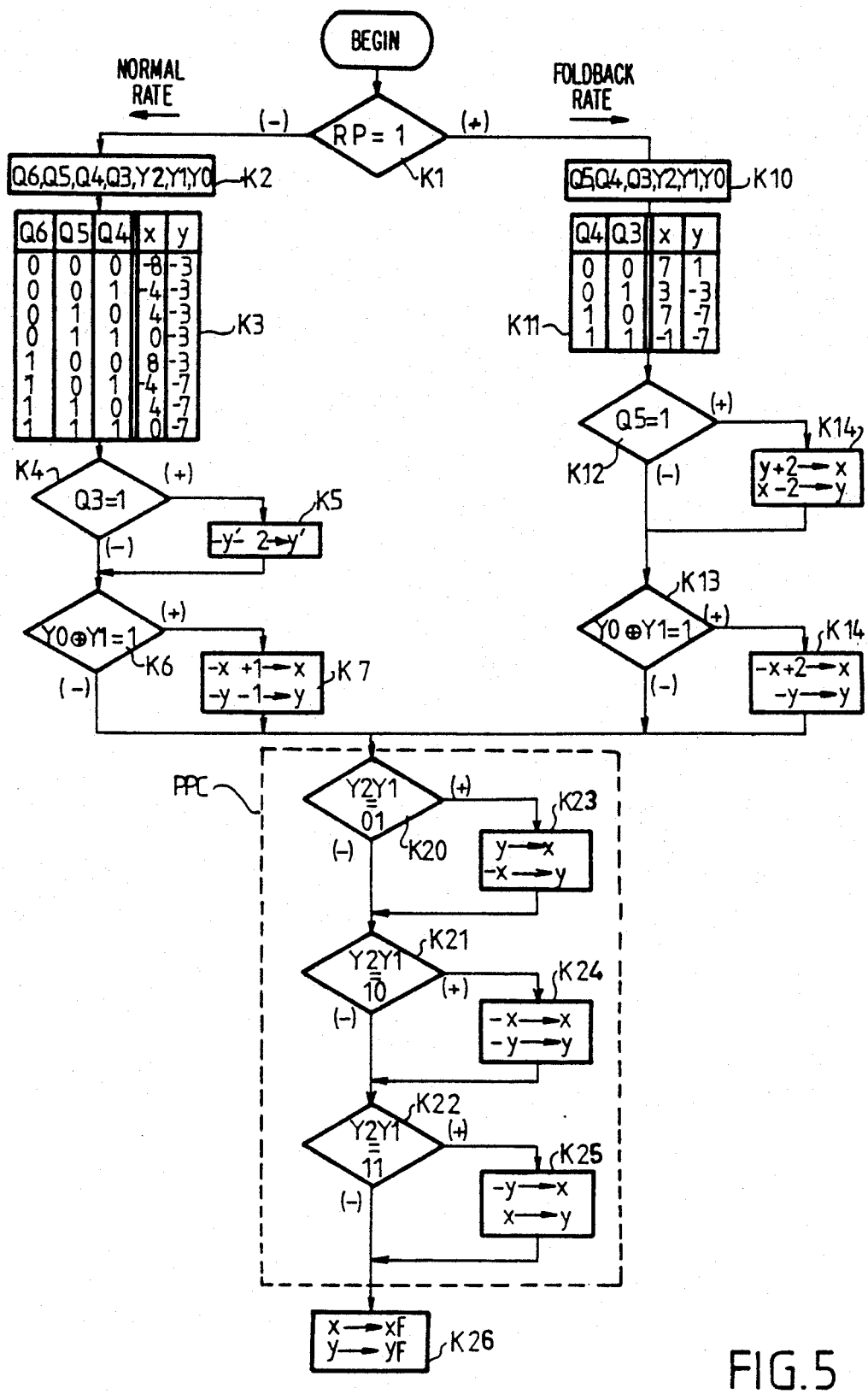
FIG. 5 shows a flowchart representing the operation of the arrangement of FIG. 3.

The operation of the preferred embodiment of the invention will now be explained with the aid of the flowchart of FIG. 5.

The structure of the program shown by means of this flowchart starts with the box K1 which indicates a test of the value RP. This value RP contained in the register 65 indicates, if the value is "1", that transmission is to take place at the foldback rate and if not, that this transmission is to take place at the normal rate.

If the normal rate has to be used, box K2 is proceeded to where it is indicated that 7 bits to be transmitted Q6, Q5, Q4, Q3, Y2, Y1, Y0 are read. As a function of the bits Q6, Q5, Q4, values are given to x and y in accordance with the Table of box K3 which is identical with the Table II. Then, at box K4, the value of the bit Q3 is tested. If this is equal to "1" the value of y is determined: this new value is $-y-2$ as is indicated in box K5. In box K6 the result of the "EXCLUSIVE-OR" operation performed with the elements Y0 and Y1 is tested. If the result is "0" a part called PPC of the program is proceeded to. If the result of the operation is "1" then a transformation is performed as is indicated in box K7, that is to say, that x assumes the value $-x+1$ and y the value $-y-1$. Finally, the part called PPC of the program is proceeded to.

If the result of the test of box K1 is positive, box K10 is proceeded to where the bits Q5, Q4, Q3, Y2, Y1 and Y0 used for the foldback rate are read. As a function of the elements Q4 and Q3 whose values may be 00, 01, 10 and 11 the values 7, 3, 7, −1 are associated to x (see box K11) and the values 1, −3, −7 and −7 are associated to y, these values being viewable as a further stored constellation of four points, applicable to the foldback transmission rate, which are indicated as circles centered about four points on the foldback transmission constellation of FIG. 4. Then, at box K12, the value of the bit Q5 is tested. If this value is "0" box K13 is proceeded to; if this is "1" the value y+2 is substituted for the value x and the value x−2 is substituted for the value y. This is indicated at box K14. At box K13 the result of the EXCLUSIVE-OR operation performed with the bits Y0 and Y1 is tested. If the result is "0" the part called PPC of the program is proceeded to. If the result is "1" a transformation as indicated at box K15 is effected, that is to say, that the value x assumes the value −x+2 and that y assumes the opposite value −y and that the part PPC of the program is proceeded to.

This part of the program is implemented both for the processing at the normal rate and at the foldback rate and it should be observed that this is advantageous because in this manner efficient use is made of the program lines which have to be introduced into the ROM memory of the set 50.

This part of the program is commenced in box K20 where the value Y2, Y1 is tested; if this is different from "01", box K21 is proceeded to, if it is equal to "01" box K23 is proceeded to where the values of x and y become y and −x respectively. At box K21 it is tested whether the value of Y2, Y1 is identical with "10"; if there is no identity, box K22 is proceeded to; if there is identity, box K24 is proceeded to where the values of x and y become −x and −y respectively. At box K22 it is tested whether the value Y2, Y1 is identical with "11"; if there is no identity, box K26 is proceeded to where the values of x and y are stored in the registers 60 and 61. If there is identity, box K25 is proceeded to which indicates a change of x and y into −y and x. From box K25 one proceeds to box K26.

I claim:

1. An arrangement for phase and amplitude modulation of a wave comprising an input for receiving groups of n bits, a phase-shifting circuit for producing two components of said wave shifted in phase with respect to each other, a modulating means for modulating the amplitude of the two components, respectively, with a pair of final amplitude values (xF,yF) corresponding to coordinates of a point selected from a transmission constellation of spaced apart points as a function of the values of bits of said groups and means for combining said two amplitude modulated components, wherein the modulating means comprises storage means for storing initial amplitude values corresponding to coordinates of points in a stored constellation, said storage means being addressed by k of the n bits of the bit groups, where k<n, for reading from said storage means an initial pair of amplitude values (x,y), and calculating means for producing the final pair of amplitude values from the initial pair of amplitude values as a function of the values of the other n−k of the n bits of the bit groups, said calculating means comprising a plurality of sequential calculating blocks, at least one of said calculating blocks comprising means for selectively arithmetically combining, by addition or subtraction, an amplitude value input to said calculating block with a constant having an absolute value equal to a component, along a coordinate, of a distance between said initial point and another point in the transmission constellation not coinciding with the initial point to form an amplitude value output from said calculating block.

2. An arrangement as claimed in claim 1, configured to selectively transmit bits at either a normal transmission rate or a foldback transmission rate, said transmission and stored constellations being applicable ones corresponding to normal and foldback transmission rates, wherein at least one other of said calculating blocks is operative for both the normal and foldback transmission rates.

3. An arrangement as claimed in claim 1, wherein the calculating means is formed from a microprocessor set.

4. An arrangement as claimed in claim 2, wherein the calculating means is formed from a microprocessor set.

5. An arrangement as claimed in claim 2, wherein said calculating block in common comprises means for selectively rotating a vector having as components a pair of amplitude values input to said selectively rotating means by any of 0, 90, 180, and 270 degrees to form a pair of amplitude values output from said selectively rotating means.

6. An arrangement as claimed in claim 1, wherein at least one other of said sequential calculating blocks comprises means for selectively rotating a vector having as components a pair of amplitude values input to said selectively rotating means by any of 0, 90, 180, and 270 degrees to form a pair of amplitude values output from said selectively rotating means.

7. An arrangement for phase and amplitude modulation of a wave configured to selectively transmit bits at either a normal transmission rate or a foldback transmission rate, the arrangement comprising an input for receiving groups of n bits, a phase-shifting circuit for producing two components of said wave shifted in phase with respect to each other, a modulating means for modulating the amplitude of the two components, respectively, with a pair of final amplitude values (xF,yF) corresponding to coordinates of a point selected from an applicable one of normal and foldback transmission constellations of spaced apart points, corresponding to said normal and foldback transmission rates, as a function of the values of the bits of said groups and means for combining said two amplitude modulated components, wherein the modulating means comprises storage means for storing initial amplitude values, said storage means being addressed by k of the n bits of the bit groups, where k<n, for reading from said storage means an initial pair of amplitude values (x,y), and calculating means for producing the final pair of amplitude values from the initial pair of amplitude values as a function of the values of the other n−k of the n bits of the bit groups, said calculating means comprising a plurality of sequential calculating blocks, at least one calculating block being operative for both the normal and foldback transmission rates.

8. An arrangement as claimed in claim 7, wherein said calculating block operative for both the normal and foldback transmission rates comprises means for selectively rotating a vector having as components a pair of amplitude values input to said selectively rotating means by any of 0, 90, 180, and 270 degrees to form a pair of amplitude values output from said selectively rotating means.

9. An arrangement for phase and amplitude modulation of a wave comprising an input for receiving groups of n bits, a phase-shifting circuit for producing two components of said wave shifted in phase with respect to each other, a modulating means for modulating the amplitude of the two components, respectively, with a pair of final amplitude values (xF,yF) corresponding to coordinates of a point selected from a transmission constellation of spaced apart points as a function of the values of bits of said groups and means for combining said two amplitude modulated components, wherein the modulating means comprises storage means for storing initial amplitude values corresponding to coordinates of points in a stored constellation, said storage means being addressed by k of the n bits of the bit groups, where k<n, for reading from said storage means an initial pair of amplitude values (x,y), and calculating means for producing the final pair of amplitude values from the initial pair of amplitude values as a function of the values of the other n−k of the n bits of the bit groups, said calculating means comprising one or more sequential calculating blocks, one of said calculating blocks comprising means for selectively rotating a vector having as components a pair of amplitude values input to said selectively rotating means by any of 0, 90, 180, and 270 degrees to form a pair of amplitude values output from said selectively rotating means.

* * * * *